United States Patent
Luo et al.

(10) Patent No.: US 10,126,029 B2
(45) Date of Patent: Nov. 13, 2018

(54) VARIABLE REFRIGERANT FLOW AIR CONDITIONING SYSTEM AND METHOD FOR CONTROLLING ELECTRONIC EXPANSION VALVE THEREOF

(71) Applicants: GD MIDEA HEATING & VENTILATING EQUIPMENT CO., LTD., Foshan (CN); MIDEA GROUP CO., LTD., Foshan (CN)

(72) Inventors: Bin Luo, Foshan (CN); Kun Yang, Foshan (CN)

(73) Assignees: GD MIDEA HEATING & VENTILATING EQUIPMENT CO., LTD., Foshan, Guangdong (CN); MIDEA GROUP CO., LTD., Foshan, Guangdong (CN)

( * ) Notice: Subject to any disclaimer, the term of this patent is extended or adjusted under 35 U.S.C. 154(b) by 0 days.

(21) Appl. No.: 15/501,101

(22) PCT Filed: Apr. 26, 2016

(86) PCT No.: PCT/CN2016/080242
§ 371 (c)(1),
(2) Date: Feb. 1, 2017

(87) PCT Pub. No.: WO2017/008554
PCT Pub. Date: Jan. 19, 2017

(65) Prior Publication Data
US 2018/0180337 A1  Jun. 28, 2018

(30) Foreign Application Priority Data

Jul. 16, 2015 (CN) .......................... 2015 1 0419343

(51) Int. Cl.
*F25B 41/06* (2006.01)
*F25B 13/00* (2006.01)
(Continued)

(52) U.S. Cl.
CPC ............ *F25B 41/062* (2013.01); *F25B 13/00* (2013.01); *F25B 41/04* (2013.01); *F24F 5/00* (2013.01);
(Continued)

(58) Field of Classification Search
CPC ...... F25B 41/062; F25B 49/022; F25B 41/04; F25B 2600/2509; F25B 2500/19;
(Continued)

(56) References Cited

U.S. PATENT DOCUMENTS

| | | | |
|---|---|---|---|
| 5,388,422 A | 2/1995 | Hayashida et al. | |
| 2006/0137366 A1* | 6/2006 | Kang | F25B 45/00 62/149 |

(Continued)

FOREIGN PATENT DOCUMENTS

| | | |
|---|---|---|
| CN | 1483974 A | 3/2004 |
| CN | 1737443 A | 2/2006 |

(Continued)

OTHER PUBLICATIONS

PCT/CN2016/080242 English translation of the International Search Report, dated Aug. 17, 2016, 2 pages.

(Continued)

*Primary Examiner* — Emmanuel Duke
(74) *Attorney, Agent, or Firm* — Lathrop Gage LLP

(57) ABSTRACT

A method for controlling an electronic expansion valve of a variable refrigerant flow air conditioning system includes steps as follows: when operating in a primary heating mode, obtaining a degree of superheat of return air of a compressor, and performing a control on an opening degree of the first electronic expansion valve according to the degree of superheat; judging the degree of superheat and the opening degree of each refrigerating indoor machine in the plurality of indoor machines; and if the degree of superheat is greater (Continued)

than a first preset degree of superheat and an opening degree in any refrigerating indoor machine reaches a maximum opening degree, obtaining a target medium pressure value by calculating a refrigerant volume of the refrigerating indoor machine reaching the maximum opening degree, and performing a medium pressure control on the first electronic expansion valve according to the target medium pressure value.

10 Claims, 4 Drawing Sheets

(51) Int. Cl.
  *F25B 41/04* (2006.01)
  *F24F 5/00* (2006.01)
(52) U.S. Cl.
  CPC ... *F25B 2313/0231* (2013.01); *F25B 2400/23* (2013.01); *F25B 2500/19* (2013.01); *F25B 2600/2509* (2013.01); *F25B 2600/2513* (2013.01); *F25B 2700/191* (2013.01); *Y02B 30/72* (2013.01)
(58) Field of Classification Search
  CPC .......... F25B 2400/23; F25B 2313/0231; F25B 2700/191; F25B 2600/2513; F24F 5/00; Y02B 30/72
  See application file for complete search history.

(56) References Cited

U.S. PATENT DOCUMENTS

| | | | | |
|---|---|---|---|---|
| 2008/0282728 | A1* | 11/2008 | Takegami | ................. F25B 1/10 62/498 |
| 2015/0068231 | A1* | 3/2015 | Rite | ........................ F25B 49/02 62/115 |

FOREIGN PATENT DOCUMENTS

| | | | | |
|---|---|---|---|---|
| CN | 101907345 | A | * | 12/2010 |
| CN | 102272534 | A | | 12/2011 |
| CN | 202792385 | U | * | 3/2013 |
| CN | 104685304 | A | | 6/2015 |
| CN | 104748429 | A | | 7/2015 |
| CN | 105066539 | A | | 11/2015 |
| JP | 108226721 | A | | 9/1996 |
| JP | H11142010 | A | | 5/1999 |
| KR | 20010048763 | A | | 6/2001 |

OTHER PUBLICATIONS

Chinese Patent Application No. 201510419343.6 First Office Action dated Feb. 28, 2017, 6 pages.
Chinese Patent Application No. 201510419343.6 English translation of First Office Action dated Feb. 28, 2017, 6 pages.

* cited by examiner

VARIABLE REFRIGERANT FLOW AIR CONDITIONING SYSTEM AND METHOD FOR CONTROLLING ELECTRONIC EXPANSION VALVE THEREOF

FIELD

The present disclosure relates to air conditioner technology field, and more particularly to a variable refrigerant flow (VRF) air conditioning system and a method for controlling an electronic expansion valve thereof.

BACKGROUND

For an air conditioning adjustment system using the variable refrigerant flow air conditioning system, usually there are both refrigerating load as well as heating load, and there will be a refrigeration requirement even in the winter. For example, regarding a conference room in the center of a building, since surrounding rooms are all heated and the temperature in the rooms is relatively high, the temperature is easily to be raised when the number of persons in the conference room is increased suddenly and thus the refrigerating load is required. However, rooms with a refrigeration requirement are usually fewer in that environment. The system still operates in a heating mode in overall.

In the air conditioning adjustment system with the heating mode and the refrigerating mode, when the heating load plays a dominant role, i.e., the air conditioning adjustment system operates in a primary heating mode, after being condensed in a heating indoor machine, a high-pressure gaseous refrigerant is evaporated in the refrigerating indoor machine and an outdoor heat exchanger respectively. If only a degree of superheat of return air of the compressor is controlled, an insufficiency for refrigerant volume flowing through the refrigerating indoor machine is easily to be caused, and an opening degree of the electronic expansion valve of the refrigerating indoor machine reaches the maximum opening degree, such that the outdoor machine wrongly determines that the refrigerating load is so large that some actions are performed wrongly, thus affecting a rapid response capability and a stability of the entire system, and further affecting a heat comfort experience of a user and an energy-saving performance of the system.

SUMMARY

Embodiments of the present disclosure seek to solve at least one of the problems existing in the related art to at least some extent. Therefore, a first objective of the present disclosure is to propose a method for controlling an electronic expansion valve of a variable refrigerant flow air conditioning system, which may perform a reasonable distribution on refrigerant volume of the refrigerating indoor machine and the outdoor heat exchanger.

A second objective of the present disclosure is to provide a variable refrigerant flow air conditioning system.

In order to realize the above objectives, according to a first aspect of embodiments of the present disclosure, a method for controlling refrigerant volume of a VRF air conditioning system is provided. The VRF air conditioning system includes: an outdoor machine, a plurality of indoor machines and a flow distributing device, the flow distributing device includes: a first heat exchanger, a second heat exchanger and a first electronic expansion valve, and the first electronic expansion valve is connected between an outlet of a first heat exchange flow path of the second heat exchanger and an inlet of a second heat exchange flow path of the second heat exchanger. The method includes steps as follows: when the VRF air conditioning system operates in a primary heating mode, obtaining a degree of superheat of return air of a compressor, and performing a control on an opening degree of the first electronic expansion valve according to the degree of superheat of return air; judging the degree of superheat of return air and an opening degree of an electronic expansion valve of each refrigerating indoor machine in the plurality of indoor machines; and if the degree of superheat of return air is greater than a first preset degree of superheat and an opening degree of an electronic expansion valve in any refrigerating indoor machine reaches a maximum opening degree, obtaining a target medium pressure value by calculating a refrigerant volume of the refrigerating indoor machine with the electronic expansion valve reaching the maximum opening degree, and performing a medium pressure control on the first electronic expansion valve according to the target medium pressure value.

According to the method in the embodiments of the present disclosure, when the variable refrigerant flow air conditioning system operates in the primary heating mode, first the degree of superheat of return air of the compressor is obtained, the opening degree of the first electronic expansion valve is controlled according to the degree of superheat of return air of the compressor, and then the degree of superheat of return air and the opening degree of the electronic expansion valve of each refrigerating indoor machine in the plurality of indoor machines are determined, and if the degree of superheat of return air is greater than a first preset degree of superheat and an opening degree of an electronic expansion valve in any refrigerating indoor machine reaches a maximum opening degree, a target medium pressure value is obtained by calculating a refrigerant volume of the refrigerating indoor machine with the electronic expansion valve reaching the maximum opening degree, and a medium pressure control is performed on the first electronic expansion valve according to the target medium pressure value, such that a reasonable distribution of the refrigerant volume of the refrigerating indoor machine and the outdoor heat exchanger is realized, and in a case of avoiding liquid returning, a situation that the outdoor machine makes a misjudgement and takes action wrongly due to insufficient refrigerant volume in the refrigerating indoor machine is also effectively avoided, such that the refrigerating capacity of the refrigerating indoor machine is improved, the stability of the system is improved, and the comfort for the user is further improved.

According to an embodiment of the present disclosure, obtaining a target medium pressure value by calculating a refrigerant volume of the refrigerating indoor machine with the electronic expansion valve reaching the maximum opening degree includes: calculating a heat exchanging capacity of the refrigerating indoor machine with the electronic expansion valve reaching the maximum opening degree, calculating an inlet enthalpy value of the refrigerating indoor machine with the electronic expansion valve reaching the maximum opening degree, and calculating a target outlet enthalpy value of the refrigerating indoor machine with the electronic expansion valve reaching the maximum opening degree; calculating the refrigerant volume of the refrigerating indoor machine with the electronic expansion valve reaching the maximum opening degree according to the heat exchanging capacity, the inlet enthalpy value and the target outlet enthalpy value, and calculating a piping pressure drop according to the refrigerant volume of the refrigerating indoor machine with the electronic expansion valve reaching the maximum opening degree and a diameter of a piping in the flow distributing device; calculating an upstream pressure of the electronic expansion valve in each indoor machine so as to obtain a maximum upstream pressure value and obtaining the target medium pressure value by adding the maximum upstream pressure value to the piping pressure drop.

The refrigerant volume of the refrigerating indoor machine with the electronic expansion valve reaching the maximum opening degree is calculated according to a formula of: $m_s=Q/(ho-hi)$, where, $m_s$ is the refrigerant volume of the refrigerating indoor machine with the electronic expansion valve reaching the maximum opening degree, ho is the target outlet enthalpy value, and hi is the inlet enthalpy value of the refrigerating indoor machine with the electronic expansion valve reaching the maximum opening degree.

According to an embodiment of the present disclosure, after performing the medium pressure control on the first electronic expansion valve, the method further includes: if the degree of superheat of return air less than a second preset degree of superheat lasts for a first preset time period or the opening degree of the electronic expansion valve in any refrigerating indoor machine reaching a minimum opening degree lasts for the first preset time period, controlling the first electronic expansion valve to quit the medium pressure control, in which the second preset degree of superheat is less than the first preset degree of superheat.

According to an embodiment of the present disclosure, before performing a control on the opening degree of the first electronic expansion valve according to the degree of superheat of return air, the method further includes: controlling the first electronic expansion valve to operate with an initial opening degree for a second preset time period.

In order to realize the above objectives, a variable refrigerant flow air conditioning system is provided in another aspect of the present disclosure, including: an outdoor machine; a plurality of indoor machines; a flow distributing device, including: a first heat exchanger, a second heat exchanger and a first electronic expansion valve, the first electronic expansion valve connected between an outlet of a first heat exchange flow path of the second heat exchanger and an inlet of a second heat exchange flow path of the second heat exchanger; and a control module, configured to obtain a degree of superheat of return air of a compressor when the VRF air conditioning system operates in a primary heating mode, and to control an opening degree of the first electronic expansion valve according to the degree of superheat of return air; and to judge the degree of superheat of return air and an opening degree of an electronic expansion valve of each refrigerating indoor machine in the plurality of indoor machines, in which, if the degree of superheat of return air is greater than a first preset degree of superheat and an opening degree of an electronic expansion valve in any refrigerating indoor machine reaches a maximum opening degree, the control module is configured to obtain a target medium pressure value by calculating a refrigerant volume of the refrigerating indoor machine with the electronic expansion valve reaching the maximum opening degree, and to perform a medium pressure control on the first electronic expansion valve according to the target medium pressure value.

According to the VRF air conditioning system in the present disclosure, when the VRF air conditioning system operates in the primary heating mode, the control module obtains the degree of superheat of return air of the compressor, and controls the opening degree of the first electronic expansion valve according to the degree of superheat of return air of the compressor, judges the degree of superheat of return air and the opening degree of the electronic expansion valve of each refrigerating indoor machine in the plurality of indoor machines, and if the degree of superheat of return air is greater than a first preset degree of superheat and an opening degree of an electronic expansion valve in any refrigerating indoor machine reaches a maximum opening degree, the control module obtains a target medium pressure value by calculating a refrigerant volume of the refrigerating indoor machine with the electronic expansion valve reaching the maximum opening degree, and performs a medium pressure control on the first electronic expansion valve according to the target medium pressure value, such that a reasonable distribution of the refrigerant volume of the refrigerating indoor machine and the outdoor heat exchanger is realized, and in a case of avoiding liquid returning, a situation that the outdoor machine masks a misjudgement and takes actions wrongly due to insufficient refrigerant in the refrigerating indoor machine is also effectively avoided, such that the refrigerating capacity of the refrigerating machine is improved, the stability of the system is improved, and the comfort for the user is further improved.

According to an embodiment of the present disclosure, the control module performs following steps to obtain a target medium pressure value by calculating a refrigerant volume of the refrigerating indoor machine with the electronic expansion valve reaching the maximum opening degree: calculating a heat exchanging capacity of the refrigerating indoor machine with the electronic expansion valve reaching the maximum opening degree, calculating an inlet enthalpy value of the refrigerating indoor machine with the electronic expansion valve reaching the maximum opening degree, and calculating a target outlet enthalpy value of the refrigerating indoor machine with the electronic expansion valve reaching the maximum opening degree; calculating the refrigerant volume of the refrigerating indoor machine with the electronic expansion valve reaching the maximum opening degree according to the heat exchanging capacity, the inlet enthalpy value and the target outlet enthalpy value, and calculating a piping pressure drop according to the refrigerant volume of the refrigerating indoor machine with the electronic expansion valve reaching the maximum opening degree and a diameter of a piping in the flow distributing device; calculating an upstream pressure of the electronic expansion valve in each indoor machine so as to obtain a maximum upstream pressure value and obtaining the target medium pressure value by adding the maximum upstream pressure value to the piping pressure drop.

The control module calculates the refrigerant volume of the refrigerating indoor machine with the electronic expansion valve reaching the maximum opening degree according to a formula of:

$$m_s=Q/(ho-hi),$$

where, $m_s$ is the refrigerant volume of the refrigerating indoor machine with the electronic expansion valve reaching the maximum opening degree, ho is the target outlet enthalpy value, and hi is the inlet enthalpy value of the refrigerating indoor machine with the electronic expansion valve reaching the maximum opening degree.

According to an embodiment of the present disclosure, after performing the medium pressure control on the first electronic expansion valve, if the degree of superheat of return air less than a second preset degree of superheat lasts for a first preset time period or the opening degree of the electronic expansion valve in any refrigerating indoor machine reaching a minimum opening degree lasts for the first preset time period, the control module is configured to control the first electronic expansion valve to quit the medium pressure control, in which the second preset degree of superheat is less than the first preset degree of superheat.

According to an embodiment of the present disclosure, before controlling the opening degree of the first electronic expansion valve according to the degree of superheat of return air, the control module further controls the first electronic expansion valve to operate with an initial opening degree for a second preset time period.

Figure 1:
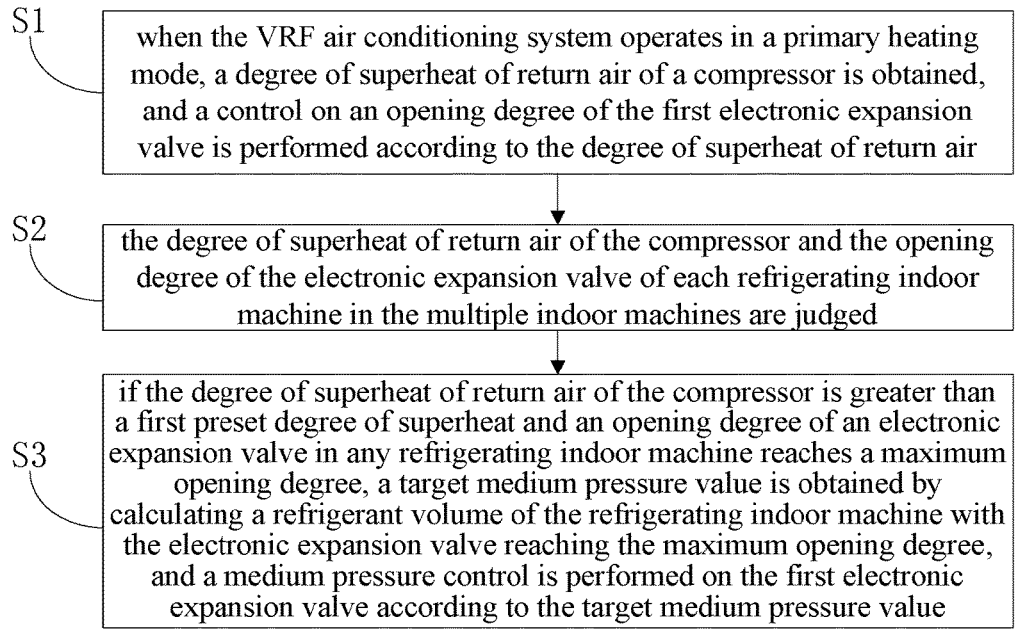
FIG. 1 is a flow chart of a method for controlling an electronic expansion valve of a variable refrigerant flow air conditioning system according to an embodiment of the present disclosure.

REFERENCE NUMERALS outdoor heat exchanger 1; four-way valve 2; compressor 3; outdoor air/liquid separator 4; one-way valve 5, 6, 7, 8; electromagnetic valve 9, 10, 11, 12; air/liquid separator 13; first heat exchanger 14; second electronic expansion valve 15; one-way valve 16, 17, 18, 19; second heat exchanger 20; first electronic expansion valve 21; outdoor machine 100; and flow distributing device 200.

DETAILED DESCRIPTION

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

The method for controlling an electronic expansion valve of a variable refrigerant flow air conditioning system and a variable refrigerant flow air conditioning system according to embodiments of the present disclosure will be described with reference to drawings.

FIG. 1 is a flow chart of a method for controlling an electronic expansion valve of a variable refrigerant flow air conditioning system according to an embodiment of the present disclosure. The VRF air conditioning system includes: an outdoor machine, multiple indoor machines and a flow distributing device, the flow distributing device includes: a first heat exchanger, a second heat exchanger and a first electronic expansion valve, and the first electronic expansion valve is connected between an outlet of a first heat exchange flow path of the second heat exchanger and an inlet of a second heat exchange flow path of the second heat exchanger.

Figure 2:
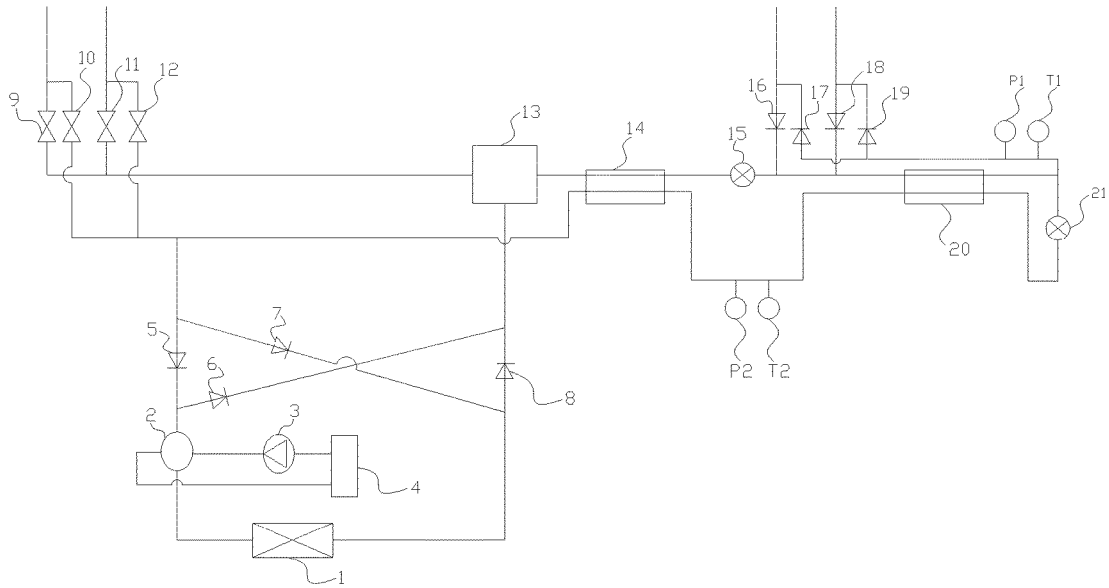
FIG. 2 is a schematic diagram of a variable refrigerant flow air conditioning system according to an embodiment of the present disclosure.

Specifically, as shown in FIG. 2, in the VRF air conditioning system, the outdoor machine includes: an outdoor heat exchanger 1, a four-way valve 2, a compressor 3, an outdoor air/liquid separator 4, four one-way valves 5, 6, 7, and 8, in which, the compressor 3 has an air outlet and a return air inlet, the air outlet of the compressor 3 is connected to one of the valve ports of the four-way valve 2, the return air inlet of the compressor 3 is connected to one end of the outdoor air/liquid separator 4. The flow distributing device includes: an air/liquid separator 13, a first heat exchanger 14, a second heat exchanger 20, a first electronic expansion valve 21, a second electronic expansion valve 15, four electromagnetic valves 9, 10, 11 and 12, and four one-way valves 16, 17, 18 and 19, in which, the first heat exchanger 14 and the second heat exchanger 20 may be plate heat exchangers, the first electronic expansion valve 21 is connected between an outlet of a first heat exchange flow path of the second heat exchanger 20 and an inlet of a second heat exchange flow path of the second heat exchanger 20. The flow distributing device is connected to the multiple indoor machines (not shown in the drawings) via the four electromagnetic valves 9, 10, 11, 12 and the four one-way valves 16, 17, 18, 19.

When the variable refrigerant flow air conditioning system operates in a primary heating mode, a high temperature and high pressure gaseous refrigerant from the air outlet of the compressor 3 enters the air/liquid separator 13 via the four-way valve 2 and the one-way valve 6, and then enters the heating indoor machine via the electromagnetic valves 9 and 11, a supercooled liquid refrigerant from the outlet of heating indoor machine enters the second heat exchanger 20 via the one-way valves 16 and 18, a part of the refrigerant from the first heat exchange flow path of the second heat exchanger 20 is sent to the refrigerating indoor machine via the one-way valves 17 and 19, and the other part of the refrigerant enters the outdoor heat exchanger 1 and is evaporated after being throttled via the first electronic expansion valve 21. The first electronic expansion valve 21 mainly controls a throttling process of the refrigerant entering the outdoor heat exchanger 1, and the opening degree of the first electronic expansion valve 21 affects whether the return air of the compressor 3 carries liquid, meanwhile the opening degree of the first electronic expansion valve 21 affects the upstream pressure of the first electronic expansion valve 21, such that the refrigerant volume passing through the refrigerating indoor machine is affected. If the first electronic expansion valve 21 is controlled only based on the degree of superheat of return air of the compressor 3, it is easy to cause that refrigerant volume passing through the refrigerating indoor machine is insufficient, and the opening degree of the electronic expansion valve of the refrigerating indoor machine reaches the maximum opening degree, such that the outdoor machine wrongly determines that the refrigerating load is so large and takes some actions wrongly, thus affecting a rapid response capability and a stability of the entire system. Therefore, a method for controlling an electronic expansion valve of a variable refrigerant flow air conditioning system is provided in the embodiments of the present disclosure, so as to eliminate the problem of insufficient refrigerant flow in the refrigerating indoor machine while avoiding liquid returning.

As shown in FIG. 1, the method for controlling an electronic expansion valve of a variable refrigerant flow air conditioning system includes steps as follows.

In step S1, when the VRF air conditioning system operates in a primary heating mode, a degree of superheat of return air of a compressor is obtained, and a control on an opening degree of the first electronic expansion valve is performed according to the degree of superheat of return air.

Specifically, when the degree of superheat of return air of the compressor is raised, the opening degree of the first electronic expansion valve is controlled to enlarge; and when the degree of superheat of return air of the compressor is dropped, the opening degree of the first electronic expansion valve is controlled to reduce.

In step S2, the degree of superheat of return air of the compressor and the opening degree of the electronic expansion valve of each refrigerating indoor machine in the multiple indoor machines are judged.

In step S3, if the degree of superheat of return air of the compressor is greater than a first preset degree of superheat and an opening degree of an electronic expansion valve in any refrigerating indoor machine reaches a maximum opening degree, a target medium pressure value is obtained by calculating a refrigerant volume of the refrigerating indoor machine with the electronic expansion valve reaching the maximum opening degree, and a medium pressure control is performed on the first electronic expansion valve according to the target medium pressure value. The first preset degree of superheat may be calibrated according to practice situation, e.g. the first preset degree of superheat may be 6 degree.

According to an embodiment of the present disclosure, obtaining a target medium pressure value by calculating a refrigerant volume of the refrigerating indoor machine with the electronic expansion valve reaching the maximum opening degree specifically includes: calculating a heat exchanging capacity of the refrigerating indoor machine with the electronic expansion valve reaching the maximum opening degree, calculating an inlet enthalpy value of the refrigerating indoor machine with the electronic expansion valve reaching the maximum opening degree, and calculating a target outlet enthalpy value of the refrigerating indoor machine with the electronic expansion valve reaching the maximum opening degree; calculating the refrigerant volume of the refrigerating indoor machine with the electronic expansion valve reaching the maximum opening degree according to the heat exchanging capacity, the inlet enthalpy value and the target outlet enthalpy value, and calculating a piping pressure drop according to the refrigerant volume of the refrigerating indoor machine with the electronic expansion valve reaching the maximum opening degree and a diameter of a piping in the flow distributing device; calculating an upstream pressure of the electronic expansion valve in each indoor machine among the multiple indoor machines so as to obtain a maximum upstream pressure value and obtaining the target medium pressure value by adding the maximum upstream pressure value to the piping pressure drop.

According to an embodiment of the present disclosure, the refrigerant volume of the refrigerating indoor machine with the electronic expansion valve reaching the maximum opening degree is calculated according to a following formula:

$$m_s = Q/(ho - hi), \quad (1)$$

where, $m_s$ is a refrigerant volume of the refrigerating indoor machine with the electronic expansion valve reaching the maximum opening degree, ho is a target outlet enthalpy value, and hi is an inlet enthalpy value of the refrigerating indoor machine with the electronic expansion valve reaching the maximum opening degree.

Specifically, as shown in FIG. 2, a pressure value and a temperature value under a medium pressure are obtained by a first pressure sensor P1 and a first temperature sensor T1 respectively, and a pressure value and a temperature value under a low pressure are obtained by a second pressure sensor P2 and a second temperature sensor T2 respectively. A KA (K represents a heat exchange coefficient; A represents a heat exchange area) value of the indoor heat exchanger and a model number of the electronic expansion valve of each of the multiple indoor machines are preset in each indoor machine, pressure-volume curves of various types of electronic expansion valves are preset in the outdoor machine, and a diameter of the piping is preset in the flow distributing device.

When the degree of superheat of return air of the compressor is greater than a first preset degree of superheat and an opening degree of the electronic expansion valve of any refrigerating indoor machine reaches the maximum opening degree, first the heat exchanging capacity Q of the refrigerating indoor machine with the electronic expansion valve reaching the maximum opening degree is calculated according to the KA value preset therein, the inlet enthalpy value hi of the refrigerating indoor machine with the electronic expansion valve reaching the maximum opening degree is calculated according to the current pressure value and the temperature value under the medium pressure, the target outlet enthalpy value ho of the refrigerating indoor machine with the electronic expansion valve reaching the maximum opening degree is calculated according to a current pressure value and a target degree of superheat under the low pressure, the refrigerant volume $m_s$ of the refrigerating indoor machine with the electronic expansion valve reaching the maximum opening degree is calculated according to the formula (1) with the inlet enthalpy value hi, the target outlet enthalpy value ho and the heat exchanging capacity Q calculated above, and the piping pressure drop ΔP is calculated according to the calculated refrigerant volume $m_s$ and the diameter of the piping preset in the flow distributing device. Finally, an upstream pressure Pins_i of an electronic expansion valve of each indoor machine is calculated according to a pressure-volume curve of the electronic expansion valve of each indoor machine and a current pressure value under the low pressure, a maximum upstream pressure value Pins is obtained, and the target medium pressure value Pms is obtained by adding the obtained maximum upstream pressure value Pins to the piping pressure drop ΔP.

Figure 3:
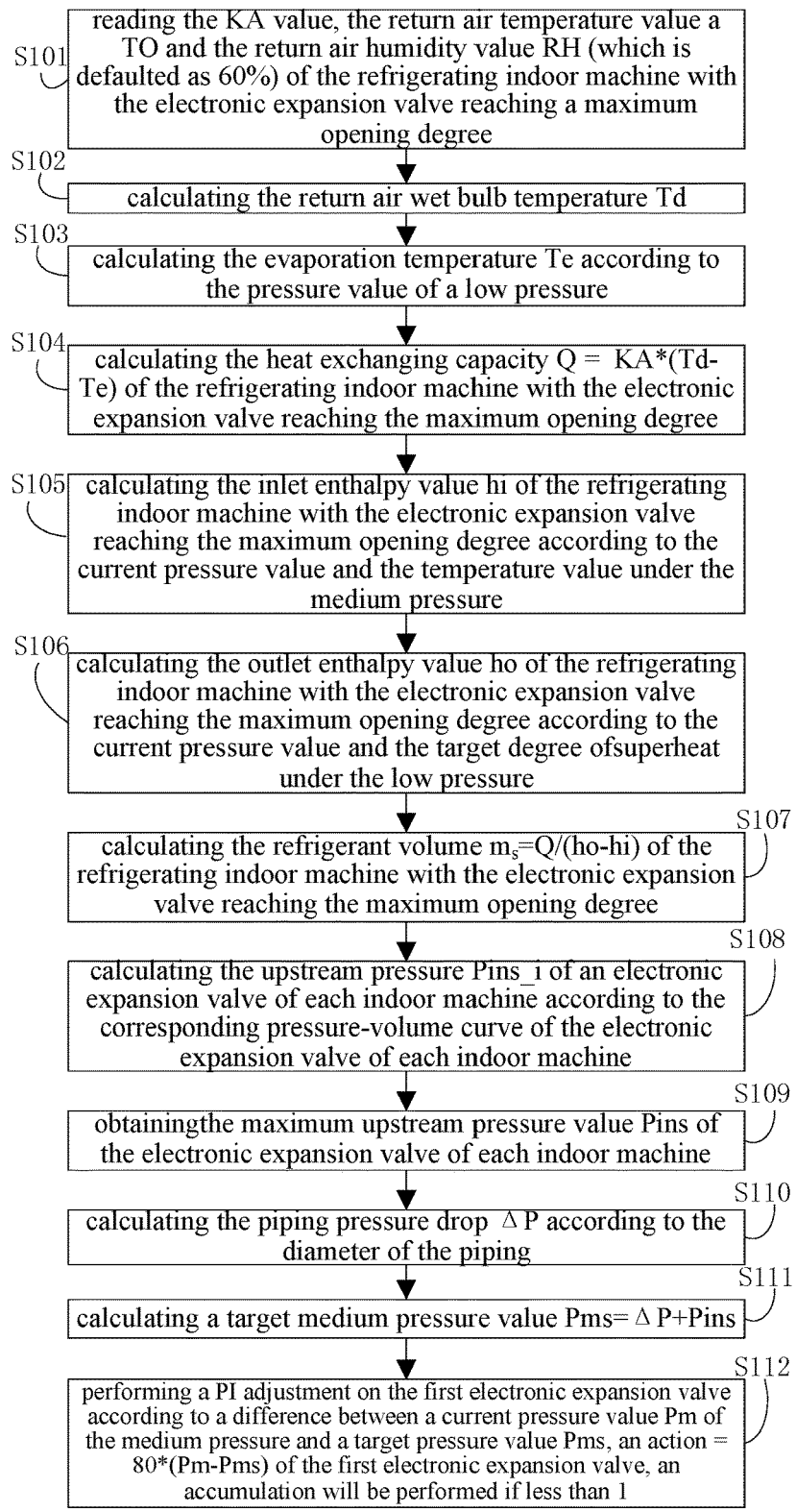
FIG. 3 is a flow chart of an adjusting process for the first electronic expansion valve according to an embodiment of the present disclosure.

Further, as shown in FIG. 3, the adjusting process of the first electronic expansion valve includes steps as follows.

In step S101, the KA value, the return air temperature value a TO and the return air humidity value RH (which is defaulted as 60%) of the refrigerating indoor machine with the electronic expansion valve reaching a maximum opening degree are read.

In step S102, the return air wet bulb temperature Td is calculated.

In step S103, the evaporation temperature Te is calculated according to the pressure value of low pressure.

In step S104, the heat exchanging capacity Q=KA*(Td−Te) of the refrigerating indoor machine with the electronic expansion valve reaching the maximum opening degree is calculated.

In step S105, the inlet enthalpy value hi of the refrigerating indoor machine with the electronic expansion valve reaching the maximum opening degree is calculated according to the current pressure value and the temperature value under the medium pressure.

In step S106, the target outlet enthalpy value ho of the refrigerating indoor machine with the electronic expansion valve reaching the maximum opening degree is calculated according to the current pressure value and the target degree of superheat under the low pressure.

In step S107, the refrigerant volume $m_s=Q/(ho-hi)$ of the refrigerating indoor machine with the electronic expansion valve reaching the maximum opening degree is calculated.

In step S108, the upstream pressure Pins_i of an electronic expansion valve of each indoor machine is calculated according to the corresponding pressure-volume curve of the electronic expansion valve of each indoor machine.

In step S109, the maximum upstream pressure value Pins of the electronic expansion valve of each indoor machine is obtained.

In step S110, the piping pressure drop $\Delta P$ is calculated according to the diameter of the piping. For example, according to the diameter of the piping and the refrigerant volume $m_s$ of the refrigerating indoor machine with the electronic expansion valve reaching the maximum opening degree, an on-way resistance and a local resistance of a piping (e.g. 40 m) may be calculated, such that the piping pressure drop $\Delta P$ is calculated.

In step S111, a target medium pressure value Pms=$\Delta P$+Pins is calculated.

In step S112, a PI adjustment is performed on the first electronic expansion valve according to a difference between a current pressure value Pm of the medium pressure and a target pressure value Pms, an action (an action of an electronic expansion valve refers to an ON/OFF operation on the electronic expansion valve)=80*(Pm−Pms) of the first electronic expansion valve, an accumulation will be performed if the value of the action is less than 1.

According to an embodiment of the present disclosure, after performing a medium pressure control on the first electronic expansion valve, if a degree of superheat of return air of a compressor is less than a second preset degree of superheat and this situation (the situation that degree of superheat of return air is less than the second preset degree of superheat) lasts for a first preset time period, or the opening degree of the electronic expansion valve of any refrigerating indoor machine reaches the minimum opening degree and the situation that the opening degree of the electronic expansion valve of any refrigerating indoor machine reaches the minimum opening degree lasts for the first preset time period, the first electronic expansion valve is controlled to quit a medium pressure control, in which, the second preset degree of superheat is less than the first preset degree of superheat, and the first preset degree of superheat, the second preset degree of superheat and the first preset time period may be calibrated according to an actual situation, for example, the first preset degree of superheat may be 6 degree, the second preset degree of superheat may be 4 degree and the first preset time period may be 1 min.

According to an embodiment of the present disclosure, before performing a control on the opening degree of the first electronic expansion valve according to the degree of superheat of return air of the compressor, the first electronic expansion valve is controlled to operate with an initial opening degree for the second preset time period. The second preset time period may be calibrated according to an actual situation, e.g. the second preset time period may be 5 min, and in addition, the initial opening degree of the first electronic expansion valve may be 180 p.

Specifically, when the VRF air conditioning system is operated in a primary heating mode, the initial opening degree of the first electronic expansion valve maintains 180 p for 5 minutes. When 5 minutes is reached, the first electronic expansion valve is controlled to enter a degree of superheat of return air control logic, i.e. when the degree of superheat of return air of the compressor is raised, the opening degree of the first electronic expansion valve is controlled to increase; and when the degree of superheat of return air of the compressor is declined, the opening degree of the first electronic expansion valve is controlled to decrease. In the control process according to the degree of superheat of return air of the compressor, if the opening degree of the electronic expansion valve of any refrigerating indoor machine reaches the maximum opening degree and the degree of superheat of return air of the compressor is greater than 6 degree, the first electronic expansion valve is controlled to enter the medium pressure control logic. After the first electronic expansion valve enters the medium pressure control logic, the target medium pressure value is obtained according to steps shown in FIG. 3, and the PI adjustment is performed on the first electronic expansion valve according to the target medium pressure value, and an adjustment coefficient e.g. 80 may be calibrated according to the actual situation. When the degree of superheat of return air of the compressor is less than 4 degree and this situation lasts for 1 min, or the opening degree of the electronic expansion valve of any refrigerating indoor machine reaches the minimum opening degree and this situation lasts for 1 min, the first electronic expansion valve is controlled to quit the medium pressure control logic and enters the degree of superheat of return air control logic.

Figure 4:
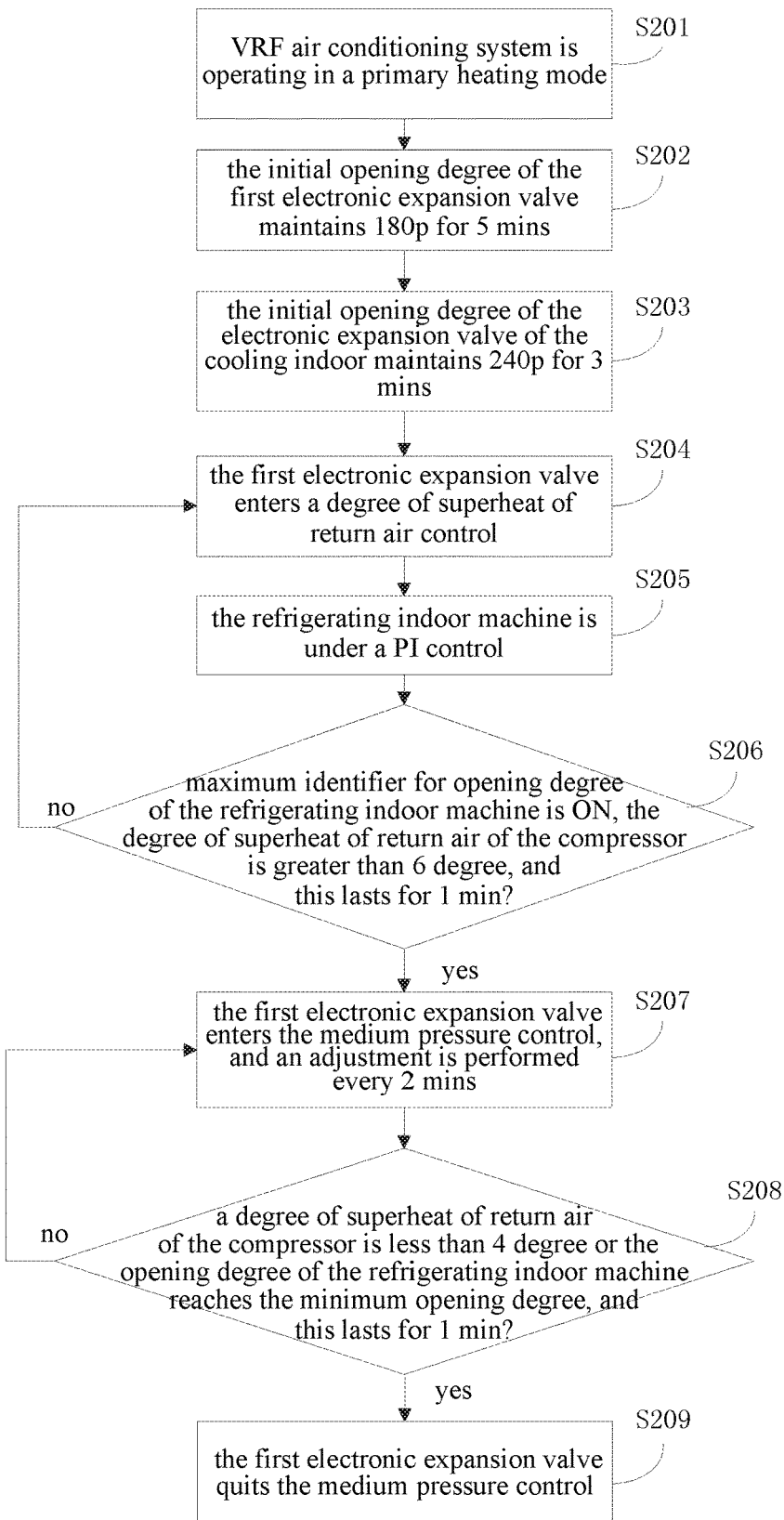
FIG. 4 is a flow chart of a method for controlling an electronic expansion valve of a variable refrigerant flow air conditioning system according to an embodiment of the present disclosure.

Further, as shown in FIG. 4, a control process for the electronic expansion valve of the variable refrigerant flow air conditioning system includes steps as follows.

In step S201, the VRF air conditioning system is operating in a primary heating mode.

In step S202, the initial opening degree of the first electronic expansion valve is 180 p, which lasts for 5 minutes.

In step S203, the initial opening degree of the electronic expansion valve of the refrigerating indoor machine is 240 p lasting for 3 minutes.

In step S204, the first electronic expansion valve enters a degree of superheat of return air control.

In step S205, the refrigerating indoor machine is under a PI control.

In step S206, it is determined whether a maximum identifier for opening degree of the refrigerating indoor machine is ON and whether the degree of superheat of return air of the compressor is greater than 6 degree, and whether the situation that the degree of superheat of return air is greater than 6 degree lasts for 1 min. If yes, step S207 is executed; and if no, step S204 is executed.

In step S207, the first electronic expansion valve enters the medium pressure control, and an adjustment is performed according to steps as shown in FIG. 3 every 2 minutes.

In step S208, it is determined whether a degree of superheat of return air of the compressor is less than 4 degree or whether the opening degree of the refrigerating indoor machine reaches the minimum opening degree, and whether the situation that degree of superheat of return air is less than 4 degree or the opening degree of the refrigerating indoor machine reaches the minimum opening degree lasts for 1 min. If yes, step S209 is executed; and if no, step S207 is executed.

In step S209, the first electronic expansion valve quits the medium pressure control.

In conclusion, when the variable refrigerant flow air conditioning system is operating in the primary heating mode, the refrigerant volume of the refrigerating indoor machine can be directly calculated, the minimum target medium pressure value is determined, and the medium pressure control is performed on the first electronic expansion valve, such that a reasonable distribution of the refrigerant volume between the refrigerating indoor machine and the outdoor heat exchanger is realized, a situation that the outdoor machine makes misjudgement and takes action wrongly due to insufficient refrigeration capacity of the refrigerating indoor machine is effectively avoided, thus improving the refrigeration capacity of the refrigerating indoor machine, the stability and the energy saving performance of the system.

In conclusion, according to the method in the embodiments of the present disclosure, when the variable refrigerant flow air conditioning system is operating in the primary heating mode, first the degree of superheat of return air of the compressor is obtained, the opening degree of the first electronic expansion valve is controlled according to the degree of superheat of return air of the compressor, the degree of superheat of return air of the compressor and the opening degree of the electronic expansion valve of each refrigerating indoor machine in the multiple indoor machines are judged, and if the degree of superheat of return air of the compressor is greater than a first preset degree of superheat and an opening degree of an electronic expansion valve in any refrigerating indoor machine reaches a maximum opening degree, a target medium pressure value is obtained by calculating a refrigerant volume of the refrigerating indoor machine with the electronic expansion valve reaching the maximum opening degree, and a medium pressure control is performed on the first electronic expansion valve according to the target medium pressure value, such that a reasonable distribution of the refrigerant volume of the refrigerating indoor machine and the outdoor heat exchanger is realized, and in a case of avoiding liquid returning, a situation that the outdoor machine makes misjudgement and takes actions wrongly due to insufficient refrigerant in the refrigerating indoor machine is also effectively avoided, thus improving the refrigerating capacity of the refrigerating machine, the stability of the system and the comfort for the user.

Figure 5:
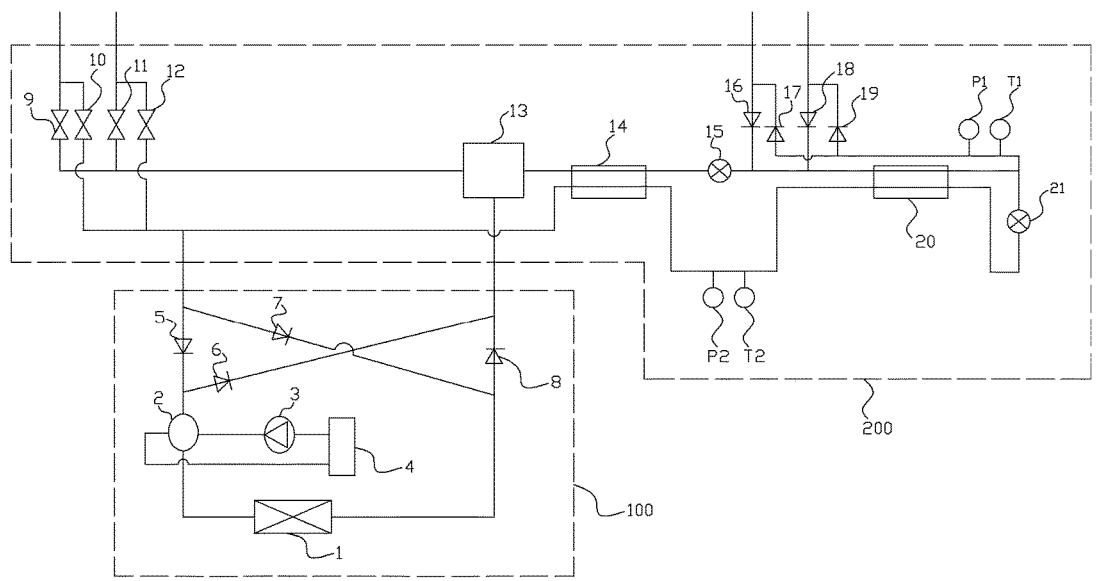
FIG. 5 is a schematic diagram of a variable refrigerant flow air conditioning system according to an embodiment of the present disclosure.

FIG. 5 is a schematic diagram of a variable refrigerant flow air conditioning system according to an embodiment of the present disclosure. As shown in FIG. 5, the VRF air conditioning system includes: an outdoor machine 100, multiple indoor machines (not shown in the drawings), a flow distributing device 200 and a control module (not shown in the drawings).

The flow distributing device 200 includes a first heat exchanger 15, a second heat exchanger 20 and a first electronic expansion valve 21, the first electronic expansion valve 21 is connected between an outlet of a first heat exchange flow path of the second heat exchanger 20 and an inlet of a second heat exchange flow path of the second heat exchanger 20. The control module is configured to obtain a degree of superheat of return air of a compressor 3 when the variable refrigerant flow air conditioning system is operating in a primary heating mode, and to control an opening degree of the first electronic expansion valve 21 according to the degree of superheat of return air; and to judge the degree of superheat of return air of the compressor 3 and the opening degree of the electronic expansion valve of each refrigerating indoor machine in the multiple indoor machines, in which, if the degree of superheat of return air of the compressor 3 is greater than a first preset degree of superheat and an opening degree of an electronic expansion valve in any refrigerating machine reaches a maximum opening degree, the control module obtains a target medium pressure value by calculating a refrigerant volume of the refrigerating indoor machine with the electronic expansion valve reaching the maximum opening degree, and performs a medium pressure control on the first electronic expansion valve 21 according to the target medium pressure value. The first preset degree of superheat may be 6 degree.

Specifically, as shown in FIG. 5, in the VRF air conditioning system, the outdoor machine 100 includes: an outdoor heat exchanger 1, a four-way valve 2, a compressor 3, an outdoor air/liquid separator 4, four one-way valves 5, 6, 7, and 8, in which, the compressor 3 has an air outlet and a return air inlet, the air outlet of the compressor 3 is connected to one of the valve ports of the four-way valve 2, the return air inlet of the compressor 3 is connected to one end of the outdoor air/liquid separator 4. The flow distributing device 200 includes: an air/liquid separator 13, a first heat exchanger 14, a second heat exchanger 20, a first electronic expansion valve 21, a second electronic expansion valve 15, four electromagnetic valves 9, 10, 11 and 12, and four one-way valves 16, 17, 18 and 19, in which, the first heat exchanger 14 and the second heat exchanger 20 may be plate heat exchangers, the first electronic expansion valve 21 is connected between an outlet of a first heat exchange flow path of the second heat exchanger 20 and an inlet of a second heat exchange flow path of the second heat exchanger 20. The flow distributing device 200 is connected to the multiple indoor machines (not shown in the drawings) via the four electromagnetic valves 9, 10, 11 and 12 and the four one-way valves 16, 17, 18, 19.

When the variable refrigerant flow air conditioning system operates in a primary heating mode, a high temperature and high pressure gaseous refrigerant from the air outlet of the compressor 3 enters the air/liquid separator 13 via the four-way valve 2 and the one-way valve 6, and then enters the heating indoor machine via the electromagnetic valves 9 and 11, a supercooled liquid refrigerant from the outlet of heating indoor machine enters the second heat exchanger 20 via the one-way valves 16 and 18, a part of the refrigerant from the first heat exchange flow path of the second heat exchanger 20 is sent to the refrigerating indoor machine via the one-way valves 17 and 19, and the other part of the refrigerant enters the outdoor heat exchanger 1 and is evaporated after being throttled via the first electronic expansion valve 21. The first electronic expansion valve 21 mainly controls a throttling process of the refrigerant entering the outdoor heat exchanger 1, and the opening degree of the first electronic expansion valve 21 affects whether the return air of the compressor 3 carries liquid, meanwhile the opening degree of the first electronic expansion valve 21 affects the upstream pressure of the first electronic expansion valve 21, such that the refrigerant volume passing through the refrigerating indoor machine is affected. If the first electronic expansion valve 21 is controlled only based on the degree of superheat of return air of the compressor 3, it is easy to cause that refrigerant volume passing through the refrigerating indoor machine is insufficient, and the opening degree of the electronic expansion valve of the refrigerating indoor machine reaches the maximum opening degree, thus the outdoor machine wrongly determines that the refrigerating load is so large that some actions are performed wrongly, such that a rapid response capability and a stability of the entire system are effected. Therefore, a variable refrigerant flow air conditioning system is provided in the embodiments of the present disclosure, and the problem of insufficient refrigerant flow in the refrigerating indoor machine is eliminated while avoiding liquid returning.

According to an embodiment of the present disclosure, when obtaining a target medium pressure value by calculating a refrigerant volume of the refrigerating indoor machine with the electronic expansion valve reaching the maximum opening degree, the control module calculates a heat exchanging capacity of the refrigerating indoor machine with the electronic expansion valve reaching the maximum opening degree, calculates an inlet enthalpy value of the refrigerating indoor machine with the electronic expansion valve reaching the maximum opening degree, and calculates a target outlet enthalpy value of the refrigerating indoor machine with the electronic expansion valve reaching the maximum opening degree; the control module calculates the refrigerant volume of the refrigerating indoor machine with the electronic expansion valve reaching the maximum opening degree according to the heat exchanging capacity, the inlet enthalpy value and the target outlet enthalpy value, and calculates a piping pressure drop according to the refrigerant volume of the refrigerating indoor machine with the electronic expansion valve reaching the maximum opening degree and a diameter of a piping in the flow distributing device; the control module calculates an upstream pressure of the electronic expansion valve in each indoor machine among the multiple indoor machines so as to obtain a maximum upstream pressure value and obtains the target medium pressure value by adding the maximum upstream pressure value to the piping pressure drop.

According to an embodiment of the present disclosure, the refrigerant volume of the refrigerating indoor machine with the electronic expansion valve reaching the maximum opening degree is calculated by the control module according to the above formula (1).

Specifically, as shown in FIG. 5, a pressure value and a temperature value under a medium pressure are obtained by a first pressure sensor P1 and a first temperature sensor T1 respectively, and a pressure value and a temperature value under a low pressure are obtained by a second pressure sensor P2 and a second temperature sensor T2 respectively. A KA value of the indoor heat exchanger and a model number of the electronic expansion valve of each in the multiple indoor machines are preset in each indoor machine, pressure-volume curves of various types of electronic expansion valves are preset in the outdoor machine 100, and a diameter of the piping is preset in the flow distributing device 200.

When the degree of superheat of return air of the compressor 3 is greater than a first preset degree of superheat and an opening degree of the electronic expansion valve of any model number machine reaches the maximum opening degree, first the heat exchanging capacity Q of the refrigerating indoor machine with the electronic expansion valve reaching the maximum opening degree is calculated by the control module according to the KA value preset in the refrigerating indoor machine with the electronic expansion valve reaching the maximum opening degree. Specifically, as shown in FIG. 3, the KA value, the return air temperature value TO and the return air humidity value RH (which is defaulted as 60%) of the refrigerating indoor machine with the electronic expansion valve reaching the maximum opening degree are read, the return air wet bulb temperature Td is calculated, the evaporation temperature Te is calculated according to the pressure value of low pressure, and the heat exchanging capacity Q=KA*(Td−Te) of the refrigerating indoor machine with the electronic expansion valve reaching the maximum opening degree is calculated according to the KA value, the calculated return air wet bulb temperature Td, the evaporation temperature Te.

Then the inlet enthalpy value hi of the refrigerating indoor machine with the electronic expansion valve reaching the maximum opening degree is calculated by the control module according to the pressure value and the temperature value under the current medium pressure, the target outlet enthalpy value ho of the refrigerating indoor machine with the electronic expansion valve reaching the maximum opening degree is calculated according to a pressure value and a target degree of superheat under the current low pressure, the refrigerant volume $m_s$ of the refrigerating indoor machine with the electronic expansion valve reaching the maximum opening degree is calculated according to the formula (1) with the inlet enthalpy value hi, the target outlet enthalpy value ho and the heat exchanging capacity Q calculated above, and the piping pressure drop ΔP is calculated according to the calculated refrigerant volume $m_s$ and the diameter of the piping preset in the flow distributing device 200. For example, according to the diameter of the piping and the refrigerant volume $m_s$ of the refrigerating indoor machine with the electronic expansion valve reaching the maximum opening degree, an on-way resistance and a local resistance of a 40 m piping may be calculated, such that the piping pressure drop ΔP is calculated.

Finally, the upstream pressure Pins_i of an electronic expansion valve of each indoor machine among the multiple indoor machines is calculated by the control module according to a pressure-volume curve of the electronic expansion valve of each indoor machine among the multiple indoor machines and a pressure value of the current low pressure, a maximum upstream pressure value Pins is obtained, and the target medium pressure value is obtained by adding the obtained maximum upstream pressure value Pins to the piping pressure drop ΔP, i.e., Pms=ΔP+Pins, and a PI adjustment is performed on the first electronic expansion valve 21 according to a difference between a pressure value Pm of the current medium pressure and a target medium pressure value Pms, an action=80*(Pm−Pms) of the first electronic expansion valve 21, an accumulation will be performed if a value of the action is less than 1.

According to an embodiment of the present disclosure, after performing a medium pressure control on the first electronic expansion valve 21, if a degree of superheat of return air of a compressor 3 is less than a second preset degree of superheat and this lasts for a first preset time period, or the opening degree of the electronic expansion valve of any refrigerating indoor machine reaches the minimum opening degree and this lasts for the first preset time period, the first electronic expansion valve 21 is controlled by the control module to quit a medium pressure control, in which, the second preset degree of superheat is less than the first preset degree of superheat, and the first preset degree of superheat, the second preset degree of superheat and the first preset time period may be calibrated according to an actual situation, for example, the first preset degree of superheat may be 6 degree, the second preset degree of superheat may be 4 degree and the first preset time period may be 1 min.

According to an embodiment of the present disclosure, before performing a control on the opening degree of the first electronic expansion valve 21 according to the degree of superheat of return air of the compressor 3, the first electronic expansion valve 21 is controlled by the control module to operate with the initial opening degree for the second preset time period. The second preset time period may be calibrated according to an actual situation, e.g. the second preset time period may be 5 minutes, and in addition, the initial opening degree of the first electronic expansion valve may be 180 p.

Specifically, when the VRF air conditioning system is operated in a primary heating mode, the initial opening degree of the first electronic expansion valve 21 is controlled by the control module to maintain 180 p for 5 minutes. When the time is accumulated to 5 minutes, the first electronic expansion valve 21 is controlled by the control module to enter a degree of superheat of return air control logic, i.e. when the degree of superheat of return air of the compressor 3 is raised, the opening degree of the first electronic expansion valve 21 is controlled by the control module to increase; and when the degree of superheat of return air of the compressor 3 is declined, the opening degree of the first electronic expansion valve 21 is controlled by the control module to decrease. In the control process according to the degree of superheat of return air of the compressor 3, if the opening degree of the electronic expansion valve of any refrigerating indoor machine reaches the maximum opening degree and the degree of superheat of return air of the compressor 3 is greater than 6 degree, the first electronic expansion valve 21 is controlled by the control module to enter the medium pressure control logic. After the first electronic expansion valve 21 enters the medium pressure control logic, the target medium pressure value is obtained by the control module according to steps shown in FIG. 3, and the PI adjustment is performed on the first electronic expansion valve according to the target medium pressure value, and an adjustment coefficient e.g. 80 may be calibrated according to the actual situation. When the degree of superheat of return air of the compressor 3 is less than 4 degree and this lasts for 1 min, or the opening degree of the electronic expansion valve of any refrigerating indoor machine reaches the minimum opening degree and this lasts for 1 min, the first electronic expansion valve 21 is controlled by the control module to quit the medium pressure control logic and to enter the degree of superheat of return air control logic.

Further, as shown in FIG. 4, when the variable refrigerant flow air conditioning system is operating in the primary heating mode, the initial opening degree of the first electronic expansion valve 21 maintains 180 p for 5 minutes, meanwhile, the initial opening degree of the electronic expansion valve of the refrigerating indoor machine maintains 240 p for 3 minutes. After the time is accumulated to 5 minutes, the first electronic expansion valve 21 enters a degree of superheat of return air control, the refrigerating indoor machine is under a PI control, when a maximum identifier for opening degree of the refrigerating indoor machine is ON, the degree of superheat of return air of the compressor 3 is greater than 6 degree, and this situation lasts for 1 min, the first electronic expansion valve 21 enters the medium pressure control, and an adjustment is performed according to steps as shown in FIG. 3 every 2 minutes. When the degree of superheat of return air of the compressor 3 is less than 4 degree or the opening degree of the refrigerating indoor machine reaches the minimum opening degree, and this lasts for 1 min, the first electronic expansion valve 21 quits the medium pressure control.

In conclusion, when the variable refrigerant flow air conditioning system is operating in the primary heating mode, the refrigerant volume of the refrigerating indoor machine can be directly calculated, the minimum target medium pressure value is determined, and the medium pressure control is performed on the first electronic expansion valve, such that a reasonable distribution of the refrigerant volume between the refrigerating indoor machine and the outdoor heat exchanger is realized, a situation that the outdoor machine makes misjudgement and takes action wrongly determining due to insufficient refrigeration capacity of the refrigerating indoor machine is effectively avoided, thus improving the refrigeration capacity of the refrigerating indoor machine, the stability and the energy saving performance of the system.

According to the variable refrigerant flow air conditioning system in the embodiments of the present disclosure, when the variable refrigerant flow air conditioning system operates in the primary heating mode, first the degree of superheat of return air of the compressor is obtained by the control module, the opening degree of the first electronic expansion valve is controlled by the control module according to the degree of superheat of return air of the compressor, the degree of superheat of return air of the compressor and the opening degree of the electronic expansion valve of each refrigerating indoor machine in the multiple indoor machines are judged by the control module, and if the degree of superheat of return air of the compressor is greater than a first preset degree of superheat and an opening degree of an electronic expansion valve in any refrigerating indoor machine reaches a maximum opening degree, the control module obtains a target medium pressure value by calculating a refrigerant volume of the refrigerating indoor machine with the electronic expansion valve reaching the maximum opening degree, and performs a medium pressure control on the first electronic expansion valve according to the target medium pressure value, such that a reasonable distribution of the refrigerant volume of the refrigerating indoor machine and the outdoor heat exchanger is realized, and in a case of avoiding liquid returning, a situation that the outdoor machine makes misjudgement and takes action wrongly due to insufficient refrigerant in the refrigerating indoor machine is also effectively avoided, thus improving the refrigeration capacity of the refrigerating machine, the stability of the system, and the comfort for the user.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to phrases like "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the above phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for controlling an electronic expansion valve of a variable refrigerant flow (VRF) air conditioning system, wherein, the VRF air conditioning system comprises: an outdoor machine, a plurality of indoor machines and a flow distributing device, the flow distributing device comprises: a first heat exchanger, a second heat exchanger and a first electronic expansion valve, wherein the first electronic expansion valve is connected between an outlet of a first heat exchange flow path of the second heat exchanger and an inlet of a second heat exchange flow path of the second heat exchanger, and the method comprises steps as follows:

when the VRF air conditioning system operates in a primary heating mode, obtaining a degree of superheat of return air of a compressor, and performing a control on an opening degree of the first electronic expansion valve according to the degree of superheat of return air;

judging the degree of superheat of return air and an opening degree of an electronic expansion valve of each refrigerating indoor machine in the plurality of indoor machines; and if the degree of superheat of return air is greater than a first preset degree of superheat and an opening degree of an electronic expansion valve in any refrigerating indoor machine reaches a maximum opening degree, obtaining a target medium pressure value by calculating a refrigerant volume of the refrigerating indoor machine with the electronic expansion valve reaching the maximum opening degree, and performing a medium pressure control on the first electronic expansion valve according to the target medium pressure value.

2. The method according to claim 1, wherein, obtaining the target medium pressure value by calculating the refrigerant volume of the refrigerating indoor machine with the electronic expansion valve reaching the maximum opening degree comprises: calculating a heat exchanging capacity of the refrigerating indoor machine with the electronic expansion valve reaching the maximum opening degree, calculating an inlet enthalpy value of the refrigerating indoor machine with the electronic expansion valve reaching the maximum opening degree, and calculating a target outlet enthalpy value of the refrigerating indoor machine with the electronic expansion valve reaching the maximum opening degree; calculating the refrigerant volume of the refrigerating indoor machine with the electronic expansion valve reaching the maximum opening degree according to the heat exchanging capacity, the inlet enthalpy value and the target outlet enthalpy value, and calculating a piping pressure drop according to the refrigerant volume of the refrigerating indoor machine with the electronic expansion valve reaching the maximum opening degree and a diameter of a piping in the flow distributing device; calculating an upstream pressure of the electronic expansion valve in each indoor machine so as to obtain a maximum upstream pressure value; and obtaining the target medium pressure value by adding the maximum upstream pressure value to the piping pressure drop.

3. The method according to claim 2, wherein, the refrigerant volume of the refrigerating indoor machine with the electronic expansion valve reaching the maximum opening degree is calculated according to a formula of:

$$m_s = Q/(ho-hi),$$

where, $m_s$ is the refrigerant volume of the refrigerating indoor machine with the electronic expansion valve reaching the maximum opening degree, ho is the target outlet enthalpy value, and hi is the inlet enthalpy value.

4. The method according to claim 1, wherein, after performing the medium pressure control on the first electronic expansion valve, the method further comprises:

if the degree of superheat of return air less than a second preset degree of superheat lasts for a first preset time period or the opening degree of the electronic expansion valve in any refrigerating indoor machine reaching a minimum opening degree lasts for the first preset time period, controlling the first electronic expansion valve to quit the medium pressure control, wherein the second preset degree of superheat is less than the first preset degree of superheat.

5. The method according to claim 1, wherein, before performing a control on the opening degree of the first electronic expansion valve according to the degree of superheat of return air, the method further comprises:

controlling the first electronic expansion valve to operate with an initial opening degree for a second preset time period.

6. A variable refrigerant flow air conditioning system, comprising:

an outdoor machine;

a plurality of indoor machines;

a flow distributing device, comprising: a first heat exchanger, a second heat exchanger and a first electronic expansion valve, the first electronic expansion valve connected between an outlet of a first heat exchange flow path of the second heat exchanger and an inlet of a second heat exchange flow path of the second heat exchanger; and a control module, configured to obtain a degree of superheat of return air of a compressor when the VRF air conditioning system operates in a primary heating mode, and to control an opening degree of the first electronic expansion valve according to the degree of superheat of return air; and to judge the degree of superheat of return air and an opening degree of an electronic expansion valve of each refrigerating indoor machine in the plurality of indoor machines, wherein, if the degree of superheat of return air is greater than a first preset degree of superheat and an opening degree of an electronic expansion valve in any refrigerating indoor machine reaches a maximum opening degree, the control module is configured to obtain a target medium pressure value by calculating a refrigerant volume of the refrigerating indoor machine with the electronic expansion valve reaching the maximum opening degree, and to perform a medium pressure control on the first electronic expansion valve according to the target medium pressure value.

7. The VRF air conditioning system according to claim 6, wherein, the control module is configured to perform following steps so as to obtain target medium pressure value by calculating the refrigerant volume of the refrigerating indoor machine with the electronic expansion valve reaching the maximum opening degree: calculating a heat exchanging capacity of the refrigerating indoor machine with the electronic expansion valve reaching the maximum opening degree, calculating an inlet enthalpy value of the refrigerating indoor machine with the electronic expansion valve reaching the maximum opening degree, and calculating a target outlet enthalpy value of the refrigerating indoor machine with the electronic expansion valve reaching the maximum opening degree; calculating the refrigerant volume of the refrigerating indoor machine with the electronic expansion valve reaching the maximum opening degree according to the heat exchanging capacity, the inlet enthalpy value and the target outlet enthalpy value, and calculating a piping pressure drop according to the refrigerant volume of the refrigerating indoor machine with the electronic expansion valve reaching the maximum opening degree and a diameter of a piping in the flow distributing device; calculating an upstream pressure of the electronic expansion valve in each indoor machine so as to obtain a maximum upstream pressure value; and obtaining the target medium pressure value by adding the maximum upstream pressure value to the piping pressure drop.

8. The VRF air conditioning system according to claim 7, wherein, the control module calculates the refrigerant volume of the refrigerating indoor machine with the electronic expansion valve reaching the maximum opening degree according to a formula of:

$$m_s = Q/(ho - hi),$$

where, $m_s$ is the refrigerant volume of the refrigerating indoor machine with the electronic expansion valve reaching the maximum opening degree, ho is the target outlet enthalpy value, and hi is the inlet enthalpy value.

9. The VRF air conditioning system according to claim 6, wherein, after performing the medium pressure control on the first electronic expansion valve, if the degree of superheat of return air less than a second preset degree of superheat lasts for a first preset time period or the opening degree of the electronic expansion valve in any refrigerating indoor machine reaching a minimum opening degree lasts for the first preset time period, the control module is configured to control the first electronic expansion valve to quit the medium pressure control, wherein the second preset degree of superheat is less than the first preset degree of superheat.

10. The VRF air conditioning system according to claim 6, wherein, before controlling the opening degree of the first electronic expansion valve according to the degree of superheat of return air, the control module further controls the first electronic expansion valve to operate with an initial opening degree for a second preset time period.

* * * * *